United States Patent
Sturkovich et al.

(10) Patent No.: US 10,798,715 B2
(45) Date of Patent: Oct. 6, 2020

(54) POINT-TO-POINT RADIO SYSTEM HAVING A PHASED ARRAY ANTENNA SYSTEM

(71) Applicant: MAXLINEAR ASIA SINGAPORE PRIVATE LIMITED, Singapore (SG)

(72) Inventors: Yaacov Sturkovich, Netanya (IL); Roman Rainov, Petah Tiqwa (IL)

(73) Assignee: MAXLINEAR ASIA SINGAPORE PRIVATE LIMITED, Singapore (SG)

( * ) Notice: Subject to any disclaimer, the term of this patent is extended or adjusted under 35 U.S.C. 154(b) by 359 days.

(21) Appl. No.: 14/703,302

(22) Filed: May 4, 2015

(65) Prior Publication Data

US 2016/0302208 A1 Oct. 13, 2016
US 2018/0352552 A9 Dec. 6, 2018

Related U.S. Application Data

(63) Continuation-in-part of application No. 14/042,418, filed on Sep. 30, 2013, now Pat. No. 9,287,920.

(60) Provisional application No. 62/146,041, filed on Apr. 10, 2015, provisional application No. 61/843,232, filed on Jul. 5, 2013.

(51) Int. Cl.

| | |
|---|---|
| *H04L 5/14* | (2006.01) |
| *H04L 27/34* | (2006.01) |
| *H04W 72/08* | (2009.01) |
| *H04L 5/08* | (2006.01) |
| *H04W 72/04* | (2009.01) |
| *H04B 7/06* | (2006.01) |
| *H04B 7/08* | (2006.01) |
| *H01Q 3/26* | (2006.01) |
| *H01Q 21/06* | (2006.01) |
| *H01Q 3/36* | (2006.01) |
| *H01Q 3/28* | (2006.01) |

(52) U.S. Cl.
CPC ........ *H04W 72/082* (2013.01); *H01Q 3/2617* (2013.01); *H01Q 21/065* (2013.01); *H04B 7/0617* (2013.01); *H04B 7/086* (2013.01); *H04L 5/08* (2013.01); *H04L 5/143* (2013.01); *H04W 72/046* (2013.01); *H04W 72/0453* (2013.01); *H01Q 3/28* (2013.01); *H01Q 3/36* (2013.01); *H04L 27/34* (2013.01)

(58) Field of Classification Search
CPC ........ H04B 7/0617; H04B 7/086; H01Q 1/00; H04W 72/046; H04L 5/08
See application file for complete search history.

(56) References Cited

U.S. PATENT DOCUMENTS 7,408,898 B1 * 8/2008 Brown ............... H04B 7/18515
370/250
2002/0011954 A1 * 1/2002 Judd ...................... H01Q 1/246
343/700 MS
(Continued)

OTHER PUBLICATIONS

Fidelity Comtech, Phased Array FAQ, 8pp., downloaded prior to the filing of this application.
(Continued)

*Primary Examiner* — Andrew Lai
*Assistant Examiner* — M Mostazir Rahman
(74) *Attorney, Agent, or Firm* — Maschoff Brennan

(57) ABSTRACT

A point-to-point radio system includes a phased array antenna system and circuitry to couple the phased array to a diplexer for steering nulls of the phased array to suppress interference.

17 Claims, 7 Drawing Sheets

(56) References Cited

U.S. PATENT DOCUMENTS

| | | | | |
|---|---|---|---|---|
| 2006/0182017 A1* | 8/2006 | Hansen | ............... | H04B 7/02 370/208 |
| 2009/0006677 A1* | 1/2009 | Rofougaran | ......... | H01Q 1/2275 710/63 |
| 2014/0282785 A1* | 9/2014 | Bowler | ............... | H04H 20/78 725/114 |
| 2015/0092622 A1* | 4/2015 | Sturkovich | ............ | H04B 1/525 370/278 |
| 2015/0181611 A1* | 6/2015 | Jung | ............... | H04B 7/0413 370/329 |
| 2015/0380816 A1* | 12/2015 | Tajika | ............ | H01Q 1/1271 370/315 |
| 2016/0156381 A1* | 6/2016 | Rydstrom | .............. | H04B 1/525 370/286 |

OTHER PUBLICATIONS

Diplexer, http://en.wikipedia.org/wiki/Diplexer, 4pp., Mar. 10, 2015.
Phased Array, http://en.wikipedia.org/wiki/Phased_array, 11pp., Mar. 10, 2015.

* cited by examiner

POINT-TO-POINT RADIO SYSTEM HAVING A PHASED ARRAY ANTENNA SYSTEM

This application claims priority to and the benefit of U.S. provisional patent application Ser. No. 62/146,041, filed Apr. 10, 2015. This application is also a continuation-in-part of U.S. patent application Ser. No. 14/042,418 (now U.S. Pat. No. 9,287,920), filed Sep. 13, 2013, which claims priority to and the benefit of U.S. provisional patent application Ser. No. 61/843,232, filed Jul. 5, 2013. Each of the above referenced applications is incorporated by reference herein in its entirety.

PRIORITY CLAIM

This application claims priority to provisional application Ser. No. 62/146,041, filed Apr. 10, 2015, which is entirely incorporated by reference.

TECHNICAL FIELD

This disclosure relates generally to telecommunication systems. More particularly, this disclosure relates to a point-to-point radio system having a phased array antenna system.

BACKGROUND

Point-to-point radio systems provide high speed, high capacity terrestrial radio communication. In a point-to-point radio system, a radio link is established between a receiver and a transmitter of two respective radios, generally in line of sight. Each respective radio forms a node or an endpoint of a radio network. Improvements in capacity and reliability of communication between such radios will enhance their performance.

DETAILED DESCRIPTION

Figure 1:
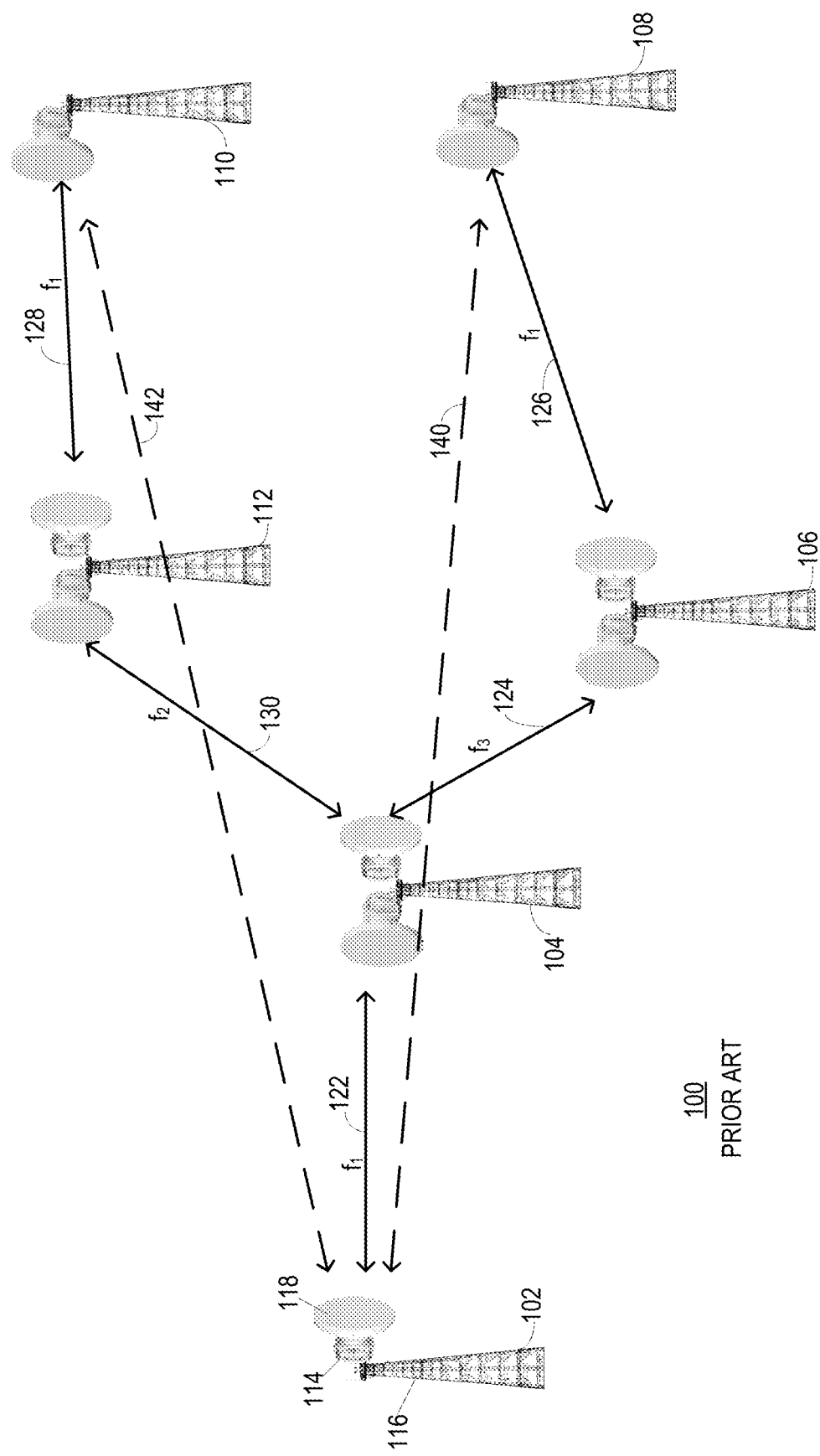
FIG. 1 shows an example of a point-to-point radio network.

Point-to-point radio systems enable high capacity communication of data and other information between respective nodes or endpoints of a telecommunication network. Capacity may be measured in bytes per second of data transmitted, or any other convenient measure. To maximize capacity, such point-to-point radio systems have evolved to incorporate advanced technology. Such systems are known to include 4096-quadrature amplitude modulation (QAM) and 4×4 multiple-input and multiple-output (MIMO) antenna systems, for example. Also, such systems make heavy use of frequency reuse, in which adjacent radio links can use the same radio frequencies for radio communication. These technologies allow system designers to increase capacity per bandwidth. This is an important goal because additional radio spectrum is often either unavailable or its acquisition is cost-prohibitive. Advanced technologies allow the radio system designer to most efficiently use the available radio spectrum.

One limit on capacity in a radio network is interference. Interference is the existence of radio energy at a frequency of interest from an external source. The presence of the interference can cause the intended receiver of a radio communication to fail to reliably and correctly receive an intended transmission. Interference may cause a reduction in capacity of data communication between two nodes of a radio system in a number of ways. Generally, interference will cause an increase in error rate, as intended transmissions are received with errors or are missed completely due to the interference. This can cause the receiver to request a partial or full retransmission of one or more packets or symbols of data. The retransmission of data thus reduces the effective capacity of the radio system. For example, in some markets in locations where population and radio systems are densely located, a point-to-point radio system employing 4096-QAM for high capacity may at times be limited to 256-QAM due to interference from various sources. Even though the system is designed for higher capacity communication, local interference greatly reduces the effective capacity of the system.

Moreover, interference can reduce frequency re-use. In order to maximize use of radio resources, including spectrum, frequencies will be reused to the extent possible. A pair of radios may be assigned to use a frequency band or frequency $f_1$ in one area, while in another area; another pair of radios will use the same frequency band or frequency $f_1$. So long as they are generally geographically isolated, the risk of interference is small. However, the possibility of interference limits the extent to which frequencies can be reused in this manner.

Some interference sources are spurious and time-limited. Examples include mobile radios passing a terrestrial radio and momentarily transmitting on a common frequency or a radio with a defective transmitter which is transmitting outside its approved spectrum. Other interference sources may be more chronic, such as another radio located in the vicinity of a receiver and operating on an overlapping frequency band.

Referring now to the drawing, FIG. 1 shows an example of a conventional point-to-point radio network 100. The point-to-point radio network 100 in this example includes a radio system 102, a radio system 104, a radio system 106, a radio system 108, a radio system 110 and a radio system 112. The number and configuration of the radio systems 102, 104, 106, 108, 110, 112 in the network 100 is exemplary only. Each respective radio system 102, 104, 106, 108, 110, 112 as illustrated includes an outdoor unit (ODU) 114 mounted on a mast 116 with a parabolic antenna 118, as shown for example in conjunction with radio system 102. It will be understood by those of ordinary skill in the art that other configurations are possible, and that conventional outdoor units operate in conjunction with an associated indoor unit (IDU). Indoor units are not shown in FIG. 1.

The radio systems 102, 104, 106, 108, 110, 112 as illustrated are configured for communication over radio channels. Communication over the respective channels may be performed using any suitable technology such as modulation scheme, data rate and frequency or bandwidth. In particular for this example, communication on each channel is performed on one or more frequencies f. Thus, radio system 102 communicates with radio system 104 on frequency $f_1$ over radio channel 122; radio system 104 communicates with radio system 106 on frequency $f_3$ over radio channel 124; radio system 106 communicates with radio system 108 on frequency $f_1$ over radio channel 126; radio system 110 communicates with radio system 112 on frequency $f_1$ over radio channel 128; and radio system 104 communicates with radio system 112 on frequency $f_2$ over radio channel 130. The noted frequencies may be bands of frequencies and are non-overlapping. However, the subscripts indicate that the assigned respective frequencies are the same for $f_1$, $f_2$, and $f_3$, respectively.

In addition to the intended communication over the assigned channels illustrated in FIG. 1, however, interference occurs among the radio systems as they transmit on their assigned channels. Thus, when radio system 102 transmits to radio system 104 at frequency $f_1$ on channel 122, the radio frequency (RF) energy is detected by the antenna of radio system 108 as interference 140. The parabolic antenna 118 used by radio system 102 is highly directional. However, radio system 108 is located downrange of radio system 104 and is subject to some amount of interference 140. In a similar manner, radio system 110 is communicating with radio system 112 on channel 128 also using frequency $f_1$, so the RF energy at frequency $f_1$ is interference to the channel 128. Similarly, when radio system 102 transmits to radio system 104 at frequency $f_1$ on channel 122, the RF energy is detected by the antenna of radio system 110 as interference 142. Radio system 110 is communicating with radio system 112 on channel 128 also using frequency $f_1$, so the RF energy at frequency $f_1$ is interference to the channel 128.

Adjacent radio systems do not see the transmission by radio system 102 as interference because they are communicating on different frequencies. Thus, radio system 106 is communicating on channel 124 at frequency $f_3$ which is different from $f_1$, so the $f_1$ RF energy does not substantially interfere at radio system 106. Similarly, radio system 112 communicates on channel 130 at frequency $f_2$ which is different from $f_1$, so the $f_1$ energy from radio system 102 does not substantially interfere with the communication on channel 130. Any $f_1$ RF energy detected on the adjacent radio systems operating on a frequency other than $f_1$ is substantially attenuated.

As illustrated in FIG. 1, the conventional radio system 100 uses parabolic dish antennas such as antenna 118 or radio system 102. These dish antennas are directional in nature, illuminating only a relatively narrow field. The field is static unless the dish antenna is moved. The field defines a radiation pattern into which RF energy is transmitted or received by the antenna. The radiation pattern is generally cone-shaped with the vertex of the cone at the surface of the dish antenna and the cone expanding radially with distance from the dish antenna. The dish antenna may be installed and aligned for best transmission and reception with a particular neighboring radio system in a point-to-point system. The radiation pattern may be generally centered on the neighboring radio system for reliable RF energy transfer. However, in many instances, adjacent radio systems can become interferers for the radio system using a dish antenna, as in the example of FIG. 1.

To reduce susceptibility of a radio system to interference, it is proposed to use a phased array antenna or antenna system in place of a conventional dish antenna in a point-to-point radio system. A phased array antenna system is an arrangement of a plurality of antenna elements configured to transmit and receive RF energy. Each respective antenna element of the plurality of antenna elements is fed with a respective feed signal. The phases and magnitudes of the respective feed signals may be controlled or varied so that the effective radiation pattern of the phased array is intentionally directed to reduce interference and thereby improve system capacity. For example, by pointing a peak of the effective radiation pattern toward a radio link partner, the sensitivity to interference on the link is reinforced in one or more desired locations. Similarly, by pointing a null of the effective radiation pattern toward a potential or actual interferer, interference is suppressed in one or more undesired directions.

Figure 2:
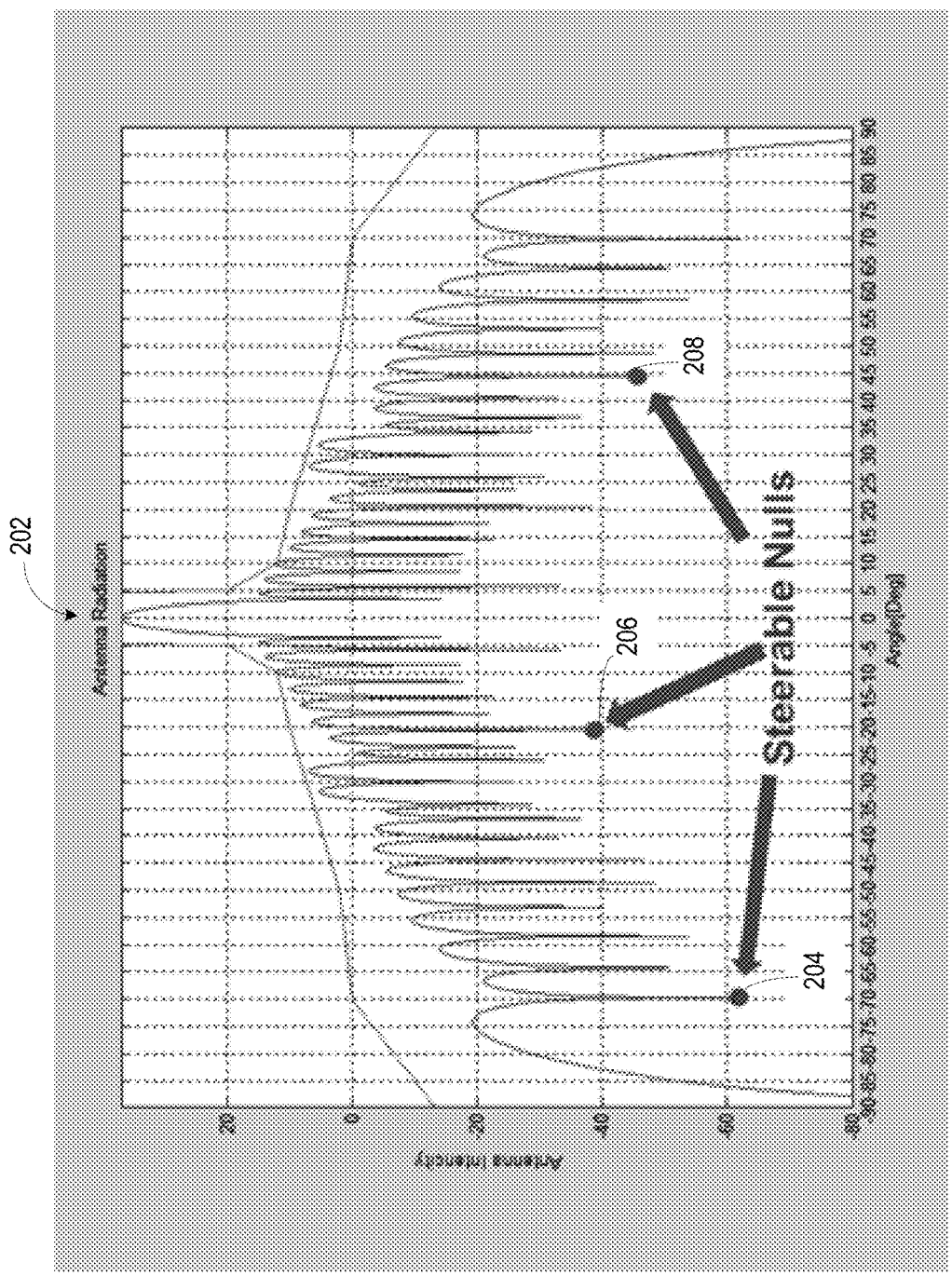
FIG. 2 illustrates an example of a radiation pattern for a phased array antenna system.

FIG. 2 illustrates an example of a radiation pattern 200 for a phased array antenna system. The radiation pattern 200 has a peak 202 at about 0 degrees azimuth. The radiation pattern also has several nulls, including a null 204 at about −70 degrees, a null 206 at about −20 degrees and a null 208 at about +45 degrees.

The peak 202 represents an area of relatively higher sensitivity to received RF signals. For example, RF energy incident on the phased array antenna system from the direction indicated by the peak 202 will be better coupled to the antenna feed and thus to a receiver circuit. Similarly, RF energy transmitted by the phased array system will be transmitted with relatively higher efficiency and therefore higher signal strength in the direction indicated by the peak 202. In the example of FIG. 2, the antenna intensity measures about +30 dB at the peak 202.

In a complementary fashion, the nulls 204, 206, 208 represent areas of relatively lower sensitivity to RF signals for reception, and areas of relatively lower signal strength for antenna transmission. In the example of FIG. 2, the null 204 has an antenna intensity of about −60 dB; the null 206 has an antenna intensity of about −40 dB; and the null 208 has antenna intensity of about −45 dB. These values shown in FIG. 2 are intended to be illustrative only.

As noted, the nulls 204, 206, 208 are steerable. In some embodiments, the peak 202 is steerable as well. By steerable, it is meant that, through proper control of signals applied to the antenna elements of the phased array antenna system, the angle at which a respective null is directed on the radiation pattern 200 may be controlled. Necessary control of the signals may include controlling the timing or phase relationships as well as controlling signal magnitude of the signals applied to the respective antenna phased array elements. This may be done in any suitable manner, such as by controlling the relative phases of the antenna feed signals applied to respective antenna elements of the phased array antenna system.

A phased array antenna system can be used in conjunction with a point-to-point radio system to reduce or eliminate interference among nodes of the point-to-point network. As noted above, in accordance with one embodiment of the present disclosure, then, the parabolic dish antennas of the radio systems 102, 104, 106, 108, 108, 110, 112 of the system 100 of FIG. 1 may be replaced with phased array antenna systems to reduce or eliminate interference from interferers including other adjacent radio systems. In such an embodiment, for example, radio system 108 may be equipped with a phased array antenna system having a radiation pattern with a peak such as peak 202 in FIG. 2 directed toward the antenna of radio system 106. The radio systems 106, 108 will communicate reliably on channel 126 at frequency $f_1$. Directing the peak 202 at the antenna system of the radio system 106 will optimize RF coupling between the antenna system of radio system 106 and the antenna system of radio system 108.

Further, radio system 108 may be equipped with a phased array antenna system having a radiation pattern with a null such as null 204 in FIG. 1 directed toward radio system 102, which is an interferer with respect to radio system 108. This will tend to minimize RF coupling between the between the antenna system of radio system 102 and the antenna system of radio system 108. The interference 140 from the radio system 102 will have minimal impact or effect on the radio system 108. The null 204 of the radiation pattern, directed at the known interferer, will suppress the interference 140 from the direction of radio system 102, even when the interference 140 is on the same frequency $f_1$ or band of frequencies.

The peaks and nulls of the antenna pattern of a phased array system for a point-to-point radio system as in FIGS. 1 and 2 may be set at the time of installation. A technician with knowledge of adjacent radio systems and adjacent interferers may manually direct the peaks and nulls of the phased array antenna system for optimal coupling. In cases where a new interferer becomes active, a new null may be subsequently steered in the direction of the new interferer.

In alternative embodiments, the radio system may include control circuitry to automatically detect interference at one or more frequencies, from one or more directions. From the detected interference, the control circuitry may vary control signals or phasing of antenna feed signals to steer one or more nulls of the antenna radiation pattern into the direction of the new interferer to thereby suppress or eliminate the interference. The control circuitry may also include or be supplemented with software including data and instructions to implement a control operation for sensing interference and steering one or more nulls of the phased array antenna system in the direction of the interferer.

Figure 3:
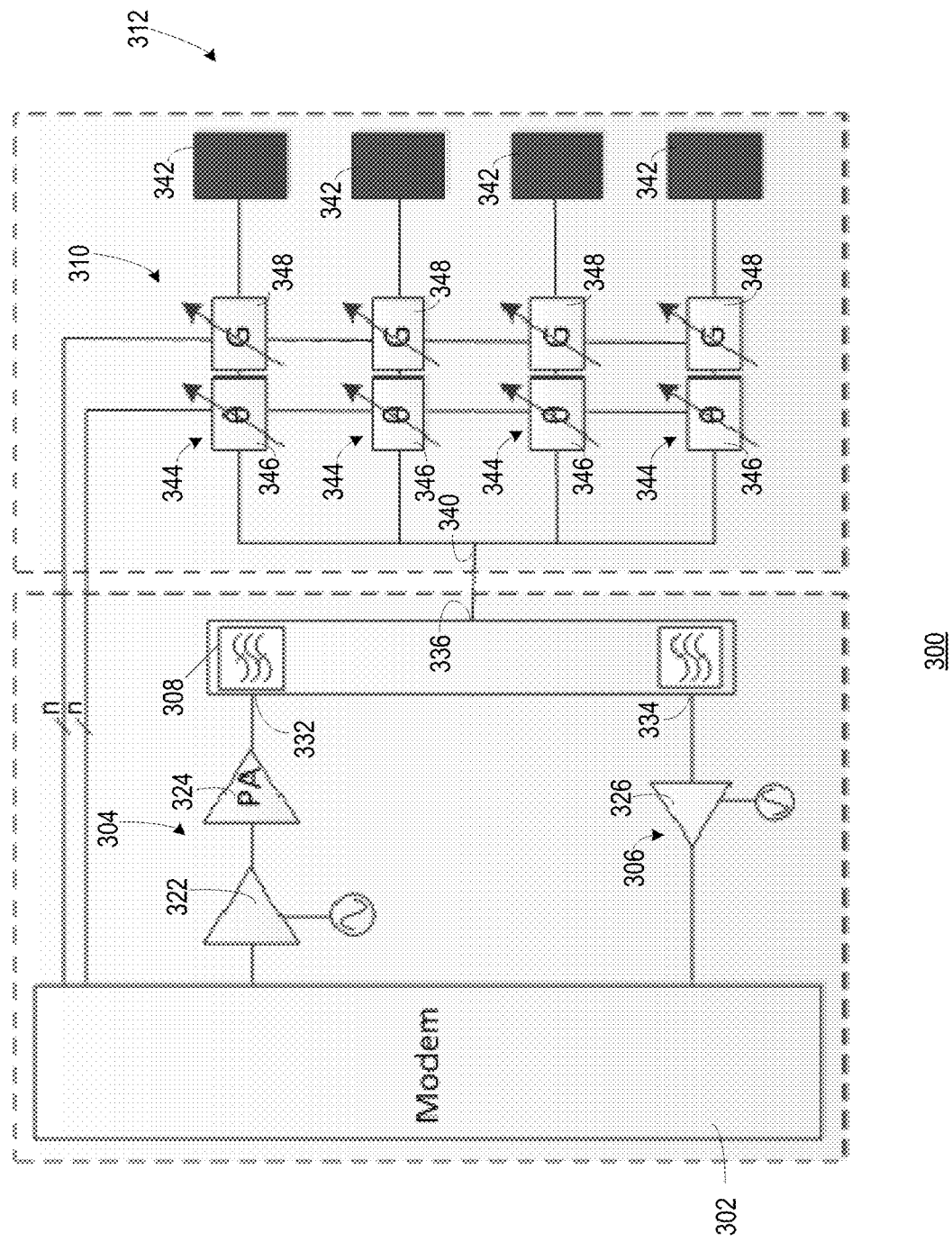
FIG. 3 is a block diagram of an example radio front end circuit for a point-to-point radio system.

FIG. 3 is a block diagram of an example radio front end circuit 300. The radio front end circuit 300 may be included in the outdoor unit (ODU) of a point-to-point radio system such as ODU 114 of point-to-point radio system 102 in FIG. 1. The radio front end circuit 300 may be used in conjunction with a point-to-point radio system in the system 100 of FIG. 1 to steer nulls and peaks of a phased array antenna system to reduce or eliminate interference received by the radio front end circuit 300.

Conventional point-to-point systems use frequency division duplexing (FDD) for communication across a channel. In an FDD system, separate frequency bands are used for transmitting and receiving simultaneously. Since different frequency bands are used for transmitting and receiving, the transmitted and received signals do not interfere with each other. This technique is a way to improve radio system capacity.

Frequency division duplex operation, however, requires use of a diplexer in conventional radio front end circuits. A diplexer is a two-way circuit that combines or multiplexes two ports together with a third port. The signals on the two ports occupy different frequency bands and can thus be combined on the third port substantially without interference. Thus, transmitted signals may be applied to one port for coupling through the third port to an antenna for transmission to a remote radio. Received signals from the antenna may be received at the third port and coupled to a second port for demodulation and decoding by a receiver.

Conventional point-to-point radio systems using a parabolic antenna may use a diplexer. The parabolic antenna, such as antenna 118 shown in FIG. 1, is a single antenna that may be coupled to the third port of the diplexer. The parabolic antenna both transmits signals to a remote radio and receives signals from the remote radio. If the transmitted signals are on a different frequency band from the received signals, a diplexer may be used to couple the parabolic antenna to the transmitter and the receiver without substantial interference between the transmitted signals and the received signals.

However, conventionally, a diplexer has not been used in radios using a phased array antenna. In a conventional point-to-point arrangement, a diplexer supports only a single antenna and a phased array antenna includes several, possibly many antennas. Further, in the point-to-point market, transmitted signals and received signals are communicated simultaneously on different frequency bands. If a diplexer is used, a microwave diplexer must support isolation between the transmit circuit and the receive circuit of 60-70 dB so that the transmit power and noise will not interfere with the receiver. It has been known to use a phased array in an FDD system using a transmit antenna and a separate receive antenna and achieving the necessary isolation by physically isolating the transmit antenna from the receive antenna and also reducing the transmit output power.

FIG. 3 shows an improved radio front end circuit 300 which may be implemented in a microwave outdoor unit of a point-to-point radio system using a diplexer and with mutual phased array transmit and receive antennas. The radio front end circuit 300 in this exemplary embodiment includes a modem 302, a transmit circuit 304, a receive circuit 306, a diplexer 308, a control network 310 and a bi-directional phased array antenna 312.

The modem 302 processes signals to be transmitted from the radio front end 300 as well as signals received at the radio front end circuit 300. On the transmit side, the modem 302 receives digital information including data or other signals from other components of the radio system and modulates signals to encode the digital information in signals to be transmitted. Modulation may include packet formation, symbol generation and encoding in one or more code words, as well as interleaving. On the receive side, the modem 312 decodes encoded code words, packets and symbols to recover data contained in the received signals. The modem 302 may serve as an interface between digital data processing within the radio system and analog signal processing in the radio front end circuit 300.

The transmit circuit 304 includes a mixer 322 and a power amplifier (PA) 324. The transmit circuit 304 receives baseband signals for transmission at an operational frequency and provides amplified signals to the diplexer 308. The mixer 322 up-converts the transmit signals from baseband frequency to the appropriate operational frequency of the antenna 312, such as 24 GHz. The power amplifier 324 amplifies the signal power to drive the transmit antenna with the transmit signals.

The receive circuit 306 includes a mixer 326. The mixer 326 down-converts the received signals from operating frequency at the antenna to baseband frequency. The receiver circuit 306 provides the down-converted signals to the modem for further processing.

The diplexer 308 includes a first port 332, a second port 334 and a third port 336. The first port 332 is coupled to the output of the transmit circuit 304. The second port 334 is coupled to the input of the receive circuit 306. The third port 336 is coupled to control network 310. The diplexer 308 is a two-way circuit that combines or multiplexes transmit signals at the first port 332 and receive signals at the second port 334 with the third port 336. The transmit signals and the receive signals on the two ports occupy different frequency bands and can thus be combined on the third port without substantial interference. Thus, the transmitted signals may be applied to the first port 332 for coupling through the diplexer 308 to the third port 336 to an antenna for transmission to a remote radio. Received signals from the antenna may be received at the third port 336 and coupled through the diplexer 308 to a second port 334 for demodulation and decoding by the modem 302. As indicated in the figure, the diplexer 308 may include circuitry such as filters on one or both ports. In an embodiment, the diplexer provides 60-70 dB of isolation between the first port 332 with the transmit path and the second port 334 with the receive path.

The control network 310 couples the phased array antenna 312 with the diplexer 308. In the drawing figure, the phased array antenna 312 is shown with four antenna elements 342. This is intended to be exemplary only. Any suitable number of antenna elements may be included in the phased array antenna 312. In one embodiment, the phased array antenna 312 includes a plurality of 4096 antenna elements.

The control network 310 operates as a beamforming circuit. The control network 310 includes a plurality of bidirectional signal paths 344. In the illustrated embodiment, the number of signal paths 344 matches the number of antenna elements 342 so that there is a one-to-one correspondence between number of signal paths and number of antenna elements. Thus, in one embodiment, there are 4096 signal paths connecting to the 4096 antenna elements. In other embodiments, the number of signal paths 344 may be reduced by multiplexing signal paths for multiple antenna elements 342 or by substituting different control structures such as software or other logic elements. The control network 310 has a single common input-output connection 340 that is coupled to the third port 336 of the diplexer 308.

Radio frequency or microwave frequency signals are conveyed between the third port 336 of the diplexer 308 and the input-output connection 340 during transmission and reception by the radio front end circuit 300.

Each signal path 344 includes a variable attenuator 346 and a variable phase shifter 348. Each respective attenuator 346 operates to selectively attenuate the amplitude of the respective signal as the respective signal passes through the respective signal path. A respective control signal is applied to the attenuator 346 to control the amount of attenuation applied by the respective attenuator 346. Similarly, each respective phase shifter operates to selectively shift the phase of the respective signal as the respective signal passes through the respective phase shifter 348. A control signal is applied to the phase shifter 348 to control the amount and direction of the applied phase shift by the respective phase shifter 348. The control signals that control the attenuation of the attenuators 346 and the phase shift of the phase shifters 348 may be provided by any convenient source such as the modem 302 or a separate antenna control function, not shown in the drawing. The antenna control function may be implemented by hardware, software or any combination of these to generate the necessary control signals.

In one embodiment, the control signals are digital signals routed on lines etched on a printed circuit board. The attenuators 346 and phase shifters 348 are embodied in integrated circuits arranged on one or both surfaces of the printed circuit board. In one embodiment, a serial peripheral interface (SPI) bus is used to connect the integrated circuits from a single control device which generates the control signals. SPI is a serial, synchronous communication interface standard.

In another embodiment, an inter-integrated circuit $I^2C$ bus may be used to convey the control signals. $I^2C$ is a serial interface standard using multiple master devices and multiple slave devices and permits daisy-chaining of the control signals. An $I^2C$ bus may be preferred in some implementations because its usage will reduce the number of control lines on the printed circuit board. The advantage of using $I^2C$ functionality to control the attenuators 346 and phase shifters 348 is that the control function can be shared among many devices using only two control lines. The control signals are digital signals and configure a plurality of registers that will control the respective phase shifters 348 and attenuators 346. The circuits of the $I^2C$ bus may be cascaded from a single input-output connection to the respective antenna elements, or 4096 antenna elements in one embodiment.

Figure 4:
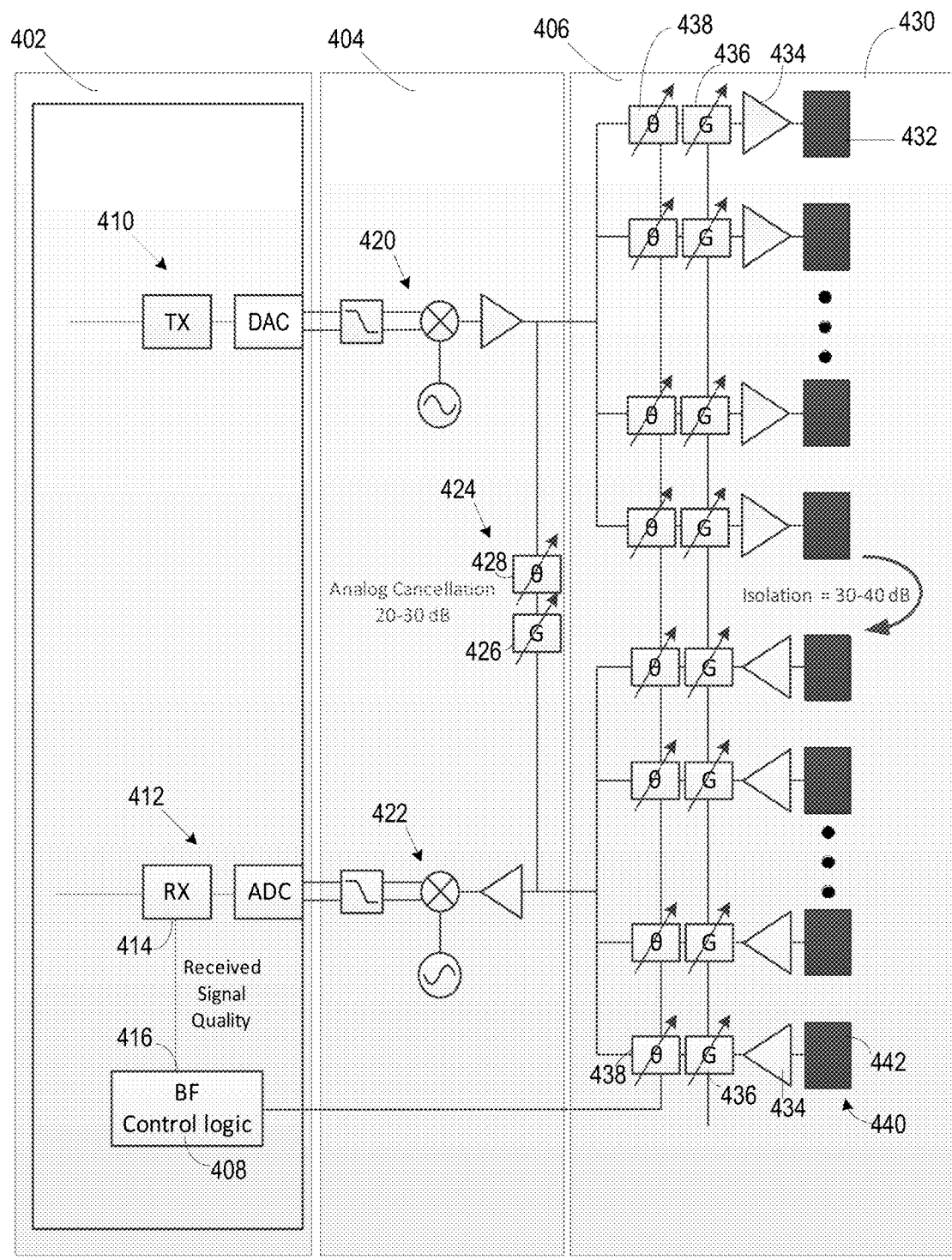
FIG. 4 is a block diagram of a second example radio front end circuit that may be used in a point-to-point radio system.

FIG. 4 shows a second example radio front end circuit 400 that may be used in a point-to-point radio system such as point-to-point radio system 102 of the system 100 of FIG. 1. The radio front end circuit 400 in this embodiment includes a modem 402, a transceiver 404 and phased array antenna and control circuit 406. Other embodiments may include other or different components.

The modem 402 may operate generally in the same manner as modem 302 described above in conjunction with FIG. 3. The modem includes a transmit path 410, a receive path 412 and beamforming (BF) control logic 408.

The transmit path 410 operates to produce transmit signals for transmission from the radio front end circuit 400 to a remote radio. For example, the transmit path 410 may operate to encode transmit data into one or more code words or symbols and interleave the symbols for transmission. The transmit path includes a digital to analog converter to produce analog transmit signals. The analog transmit signals from the transmit path are conveyed to a transmit circuit 420 of the transceiver 404.

The receive path 412 operates to demodulate and decode received signals from a remote radio. The receive path 412 produces digital data for subsequent processing in a radio system including the radio front end circuit 400. The receive path 412 includes a received signal quality output 414 operative to provide a received signal quality output signal. The received signal quality output signal provides an indication of the signal quality of the received signal. Any suitable signal may be provided and any suitable circuitry may be used to produce this signal, including a conventional received signal strength indication (RSSI) circuit. Alternatively, or in addition, the received signal quality output signal may include a measure of signal to noise ratio (SNR) and error vector magnitude (EVM).

In addition, the modem 402 includes beamforming control logic 408. As will be discussed in greater detail below, the beamforming control logic 408 provides control signals to attenuator circuits and phase shifting circuits of the phased array antenna and control circuit 406. The beamforming control logic 408 has an input 416 coupled to the received signal quality output 414 of the receive path 412 to receive the received signal quality output signal.

The beamforming control logic 408 operates in response to the received signal quality output signal to generate the control signals for the attenuator circuits and phase shifting circuits of the phased array antenna and control circuit 406. In some embodiments, the beamforming control logic 408 implements an adaptive algorithm that monitors signal quality parameters such as RSSI, SNR and EVM from the received path 412 and adjusts phase and gain shifting configurations of the phased array antenna and control circuit 406. After that, the algorithm recursively checks received signal quality and updates phase shifting and gain shifting until the algorithm finds an optimal operating point. The algorithm may use or implement a least means square (LMS) adaptation algorithm. An exemplary procedure for adaptive beamforming will be described below in conjunction with FIG. 5.

The transceiver 404 includes a transmit circuit 420, a receive circuit 422 and an analog cancellation circuit 424. The transmit circuit 404 may be constructed similarly and operate substantially in the same manner as the transmit circuit 304 of FIG. 3. In the same manner, the receive circuit 406 may be constructed similarly and operate substantially in the same manner as the receive circuit 306 of FIG. 3.

The analog cancellation circuit 424 operates to electrically isolate the transmit circuit 420 from the receive circuit 422. In the illustrated embodiment, the analog cancellation circuit includes a variable gain stage 426 and a variable phase shifter 428. The gain stage 426 and phase shifter 428 operate in response to control signals to maintain a suitable isolation between the transmit circuit 420 and the receive circuit 422.

The analog cancellation circuit 424 permits elimination of a diplexer such as the diplexer 308 of the radio front end circuit 300 of FIG. 3. A diplexer provides isolation by filtering transmit signals from the transmit circuit 420 from the receive circuit 422 when a common antenna is used for both transmitting and receiving. In the embodiment of FIG. 4, separate transmit and receive antenna portions are used so no diplexer is necessary or used. The analog cancellation circuit 424 operates as a cancellation mechanism that sums up in anti-phase the transmitted signals of the transmit circuit 420 with received signals of the receive circuit 422 to create cancellation and thus isolation between the transmit path and the receive path of the transceiver 404. The control signals that control gain of the gain stage 426 and phase shift of the phase shifter 428 may be dynamically controlled to maintain isolation above a desired threshold, such as 20 to 30 dB.

The phased array antenna and control circuit 406 includes a phased array antenna having a transmit portion 430 and a receive portion 432. The transmit portion 430 includes a plurality of phased array antenna elements 434. Each respective phased array antenna element 434 operates in conjunction with an amplifier 436, a variable gain block 438 and a variable phase shifter 440.

The receive portion 432 includes a plurality of phased array antenna elements 442. Each respective phased array antenna element 442 operates in conjunction with an amplifier 444, a variable gain block 446 and a variable phase shifter 444.

Operation of the phased array antenna and control circuit 406 is similar to operation of the phased array antenna 312 and control network 310 described above in conjunction with FIG. 3. The respective variable gain blocks and variable phase shifters operate in response to control signals received from the beamforming control logic 408 to steer a beam of the antenna. A transmit beam is formed by the transmit portion 430. A receive beam is formed by the receive portion 432.

Thus, in the embodiment of FIG. 4, the diplexer 308 used in the embodiment of FIG. 3 has been eliminated from the circuit. This is desirable because the diplexer is a relatively expensive component, since it must provide a high degree of isolation and operate at very high microwave frequencies. Equipment vendors must keep a substantial number of diplexer models on hand which adds to the cost of the devices. Eliminating the diplexer from the analog front end circuit of a point-to-point radio system substantially reduces the cost of the radio system.

Also, the radio system may be implemented with a phased array antenna, with separate transmit beams and receive beams to cancel interference. In particular, the receive beam may be steered in the direction of a known interferer to actively reduce the interference at the receiver by spatially aligning a null of the antenna radiation pattern with the interferer. This enhances frequency reuse in the point-to-point radio system and thereby improves capacity and efficiency of utilization of radio spectrum.

Figure 5:
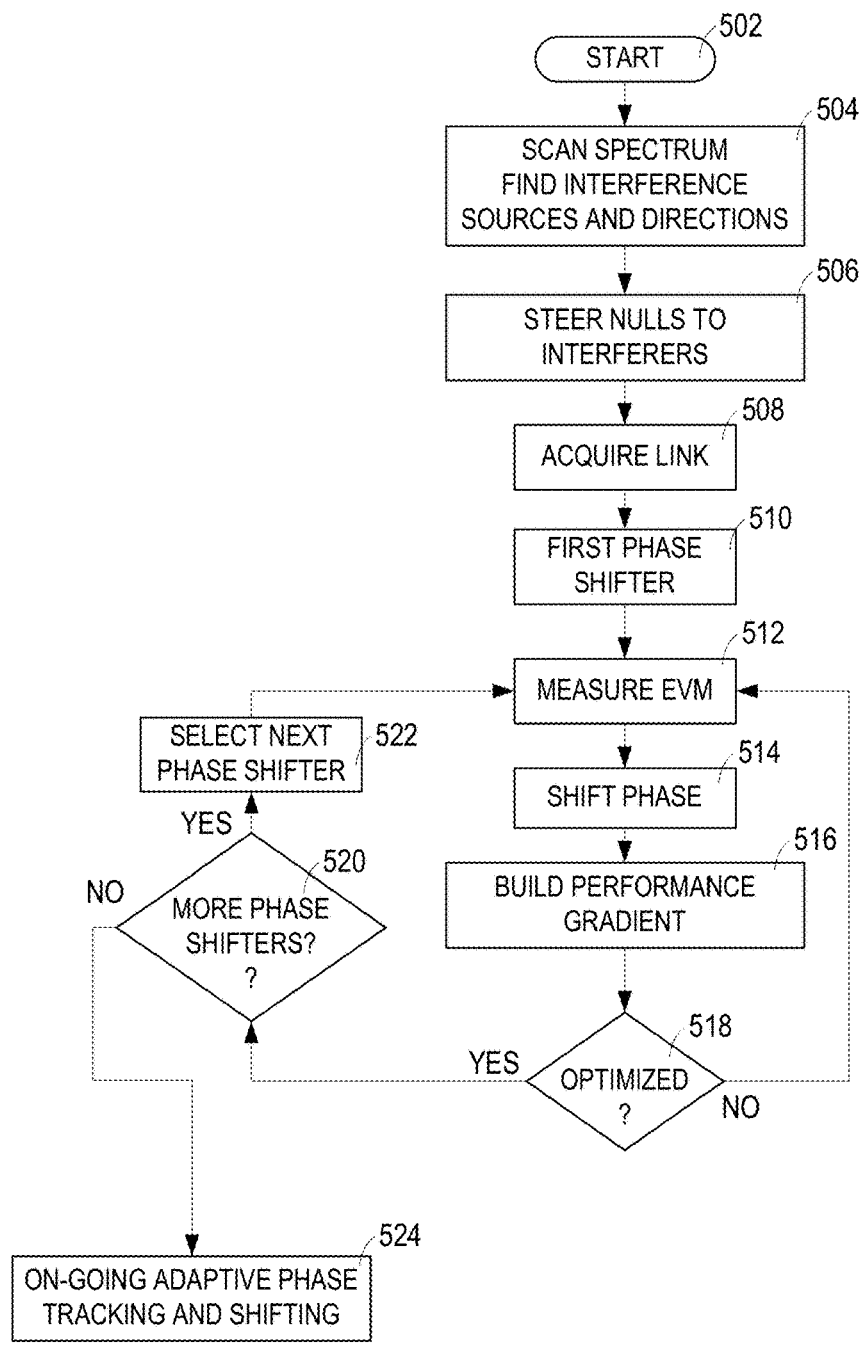
FIG. 5 is a flow diagram illustrating an example of an adaptive beamforming algorithm for a point-to-point radio system

FIG. 5 is a flow diagram illustrating an example of an adaptive beamforming method 500 for a point-to-point radio system such as the point-to-point radio network 100 of FIG. 1. The method begins at block 502. The initial steps of the method 500 may be used during installation and activation of the point-to-point radio network, or of any individual point-to-point radio system in the network, or during addition of a new point-to-point radio system to the network, or during maintenance, repair or upgrade of any point-to-point radio system in the network.

At block 504, upon activation of a point-to-point radio system with a phased array antenna, the phased array is used to scan the available spectrum and to locate any interference sources and identify the directions from which interference is received. The spectrum scanned may be all relevant frequency bands that the point-to-point radio network uses, or it may be a subset thereof. For example, if the point-to-point radio system is assigned to use only frequencies $f_1$ and $f_2$, the scan of block 504 may be limited to just those frequencies or frequency bands, to the exclusion of all other frequency bands. The process of block 504 may involve a step-wise scan and listen process, advancing iteratively through available frequencies or channels to locate any interference. Pertinent data may be noted and stored, such as the frequency bands at which the interference is located, relative strength of the interference and direction from which the interference is received.

At block 506, the point-to-point radio system steers nulls of the antenna pattern of the phased array antenna in the directions of the interferers detected in block 504. For example, data defining the direction from which the interference was determined to originate may be retrieved from storage. This direction data then may be used to retrieve data from a table which associates azimuth direction from the antenna which respective phase shifter and gain shifter values required to form the null of the antenna pattern in the desired direction. By providing the determined phase shifter and gain shifter values to variable gain blocks and variable phase shifters, the direction of the null in the antenna pattern is steered in the desired direction to suppress the interference.

Once the nulls have been suppressed by steering the nulls in appropriate directions, one or more links are acquired by the point-to-point radio system. The links may be active data communication links or control links for controlling the network or radios within the network. The point-to-point radio system begins its operational life, with the benefit of greatly reduced interference originating from nearby radios operating the same or similar frequencies. This reduction in interference allows a substantial increase in data throughput by minimizing the need for re-transmissions due to lost frames or reduced modulation rates.

However, due to variations, the identification, location and suppression of nulls may need to be updated. For example, the steering of the nulls by the phased array may be inaccurate due to variation in components, environment, and so on. Also, additional interferers may enter the environment. Accordingly, block 510 beings an adaptive process for updating the beamforming and beam steering. A first phase shifter of the phased array antenna is selected at block 510.

At block 512, a signal quality parameter is measured for the received signal. In the exemplary embodiment, error vector magnitude (EVM) is used as an indicator of signal quality. However, in other embodiments, any other suitable signal quality parameter or value, or set of parameters, could be used. The signal quality parameter is used as an input to the adaptive beam steering algorithm.

At block 514, the first phase shifter is adjusted to change its effect on the beam direction or the antenna pattern of the phased array antenna. At block 516, a performance gradient is built. Data are collected and stored relating the control signals applied to the variable gain block and variable phase shifter of the phase shifter, along with the effect on received interference. So long as performance improves, adjustments continue to be made. Once performance, as measured by EVM or other signal quality parameter, begins to degrade, block 518, at block 520 it is determined if there are more phase shifters to adjust. If so, at block 522, a next phase shifter is selected and the process of blocks 512, 514, 516, 518, 520 is repeated. The process is repeated recursively until the best performance, as measured by EVM or other signal quality parameter, is optimized.

When all phase shifters of the phased array antenna have been adjusted, control proceeds to block 524. In block 524, an on-going adaptive phase shifting algorithm may be implemented. Such an algorithm monitors antenna performance and adaptively corrects the phase shifters so that EVM remains optimized.

Figure 6:
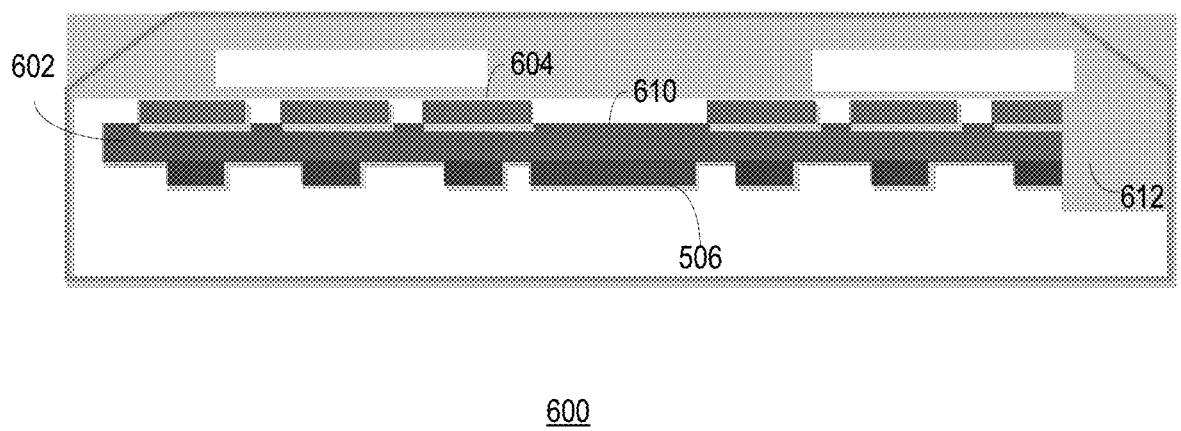
FIG. 6 illustrates an example circuit for implementing a phased array antenna and control circuit.

FIG. 6 illustrates an example circuit for implementing a phased array antenna and control circuit. FIG. 6 shows a cross-section through a printed circuit board 602 which may implement the phased array antenna and control circuit 406 of FIG. 4, for example. In this exemplary embodiment, antenna elements 604 are mounted on a first side 610 of the printed circuit board 602 and active circuit components are mounted on the second side 612 of the printed circuit board 602. The active circuit components include baseband and radio frequency (RF) circuits 606 and analog front end circuits 608. Electrical connections between the baseband and RF circuits 606 and the analog front end circuits on the second side 612 and the antenna elements 604 on the first side 610 of the printed circuit board 602 may be made via electrical vias through the printed circuit board 602.

The baseband and RF circuits 606 generally include the modem 402 and transceiver 404 of the embodiment of FIG. 4. Other circuits may be included as well. The analog front end circuit 608 generally includes the variable gain circuits, phase shifters and the amplifiers of the phased array antenna and control circuit 406 of the embodiment of FIG. 4. Other partitioning and arrangement of the circuit elements may be used in other embodiments.

Figure 7:
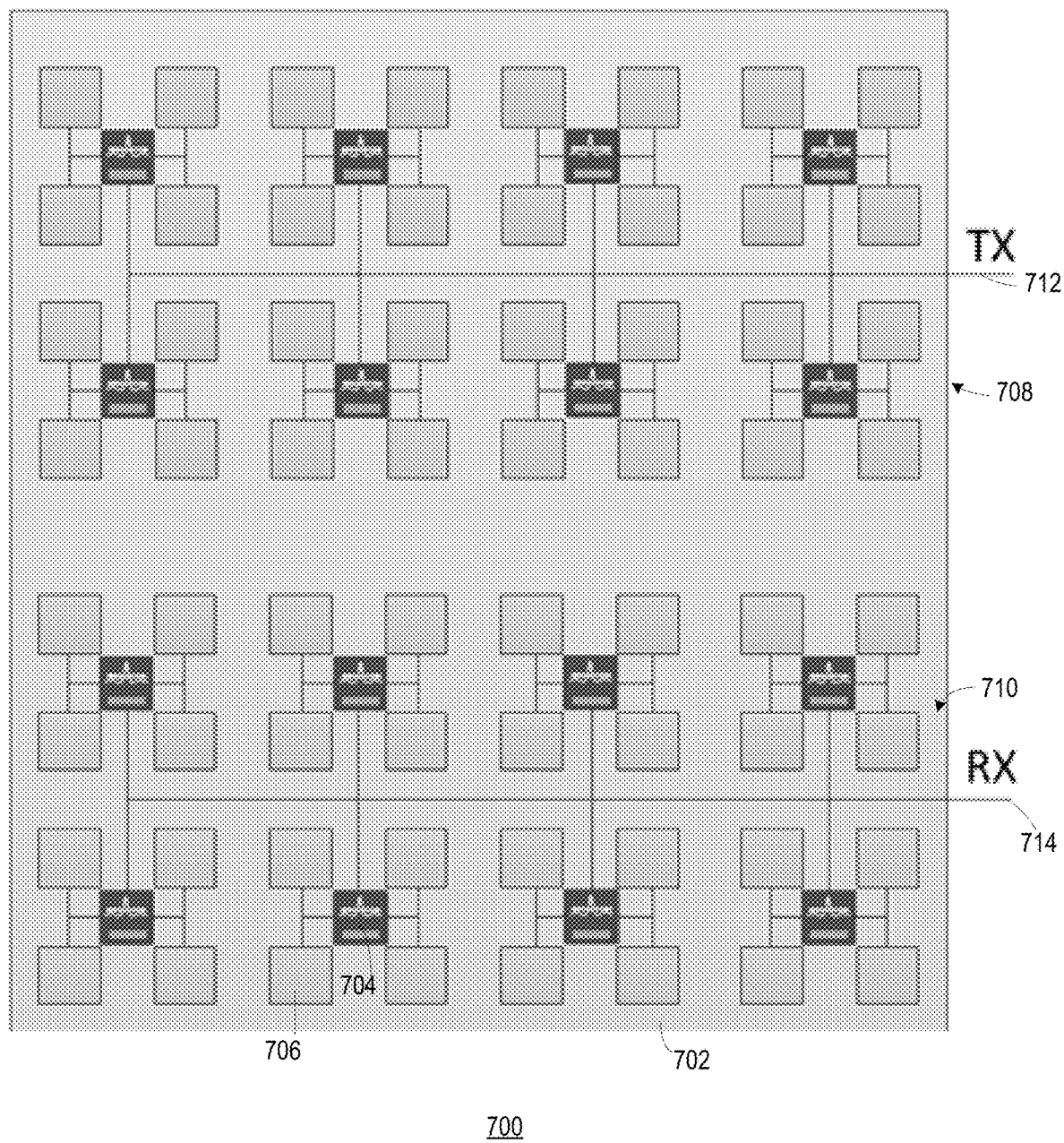
FIG. 7 illustrates a second example circuit for implementing a phased array antenna and control circuit.

FIG. 7 illustrates a second example circuit for implementing a phased array antenna and control circuit 700. In particular, FIG. 7 is a top view of a printed circuit board 702 implementing the phased array antenna and control circuit 700. In the embodiment of FIG. 7, the analog front end circuits 704, including the variable gain circuits, phase shifters and the amplifiers of the phased array antenna and control circuit 406 of the embodiment of FIG. 4, are arranged on the surface of the printed circuit board 702 with the phased array antenna elements 706. A transmit portion 708 and a receive portion 710 are physically isolated on the printed circuit board 702. The transmit portion 708 is driven by transmit feed 712. Similarly, the receive portion is driven by receive feed 714.

In some embodiments, two polarized elements can be used for cross-polarization to support a double capacity point-to-point radio system on the single printed circuit board. Thus, when the antenna is printed on a printed circuit board such as printed circuit board 702, the design can also use vertical and horizontal elements to make the antenna to support dual polarization and transmit with twice the capacity. In one exemplary embodiment, antenna area of the phased array antenna may be split or segmented into two portions. One portion is then designated for vertical polarization elements and the other portion is then designated for horizontal polarization elements. One advantage of this approach is a straight forward design. However, a disadvantage is a failure to utilize antenna area and the loss of 3 dB because of the split. In a second exemplary embodiment, dual polarized elements may be placed on the entire antenna area, adding +3 dB to system gain.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A radio system comprising:
a modem;
a transmitter circuit, wherein the transmit circuit comprises a first plurality of front end circuits;
a receiver circuit, wherein the receiver circuit comprises a second plurality of front end circuits;
a phased array antenna system configured for transmitting and receiving radio signals, the phased array antenna system having an antenna pattern having a plurality of nulls, wherein each front end circuit of the first plurality of front end circuits is coupled to a plurality of transmit antenna elements and each front end circuit of the second plurality of front end circuits is coupled to a plurality of receive antenna elements;
a beamforming circuit coupled to the phased array antenna system; and
a control circuit coupled to the beamforming circuit to steer one or more nulls of the plurality of nulls of the antenna pattern in direction of an interferer to substantially reduce unwanted interference from radio frequency signals received by the receiver circuit, wherein the control circuit is configured to sum up, in anti-phase, radio frequency signals transmitted by the transmitter circuit with radio frequency signals received by the receiver circuit, and wherein the control circuit is configured to electrically isolate the transmit circuit from the receive circuit, without using a diplexer circuit, and wherein the control circuit is configured to maintain a performance gradient through an adjustment to at least one of (a) a phase shift configuration or (b) a gain shifting configuration, and recursively check received signal quality about an optimal operating point responsive to the adjustment to the at least one of (a) the phase shift configuration or (b) the gain shifting configuration.

2. The radio system of claim 1, wherein the transmitter circuit transmits radio frequency signals simultaneously with reception of the radio frequency signals by the receiver circuit.

3. The radio system of claim 1, wherein the radio system comprises a node of a point-to-point radio system configured for radio communication with a second node of the point-to-point radio system over an assigned frequency spectrum, and wherein the control circuit is configured to steer the one or more nulls of the plurality of nulls of the antenna pattern to substantially reduce interference on the assigned frequency spectrum.

4. The radio system of claim 3, wherein the control circuit is configured to steer the one or more nulls of the plurality of nulls of the antenna pattern to reduce interference at the receiver circuit with radio frequency signals on the assigned frequency spectrum by at least 20 dB.

5. The radio system of claim 1, wherein the modem comprises a 4096-quadrature phase amplitude modulator.

6. The radio system of claim 1, wherein the beamforming circuit comprises a plurality of phase and gain shifters configured to receive a plurality of received signals from the phased array antenna system and provide to the control circuit a single received signal, the control circuit substantially suppressing the unwanted interference.

7. The radio system of claim 6, wherein the plurality of phase and gain shifters are configured to apply respective phase shifts to respective received signals of the plurality of received signals to produce the antenna pattern having the plurality of nulls.

8. The radio system of claim 6, wherein a second plurality of phase and gain shifters are configured to receive a single transmit signal and to produce a plurality of phased array antenna signals having respected shifted phase values to produce the antenna pattern having the plurality of nulls.

9. A point-to-point radio system comprising: a modem;
a phased array antenna system including a transmit portion and a receive portion, wherein the transmit portion comprises a first plurality of front end circuits and the receiver portion comprises a second plurality of front end circuits, and wherein each front end circuit of the first plurality of front end circuits is coupled to a plurality of transmit antenna elements and each front end circuit of the second plurality of front end circuits is coupled to a plurality of receive antenna elements; and
a transceiver comprising:
a transmit circuit coupled with the transmit portion of the phased array antenna system;
a receive circuit coupled with the receive portion of the phased array antenna system; and
a cancellation circuit coupled to the transmit circuit and the receive circuit and configured to electrically isolate the transmit circuit from the receive circuit, without using a diplexer, during simultaneous transmission of radio frequency signals by the transmit circuit and reception of radio frequency signals by the receive circuit, wherein the cancellation circuit is configured to sum up, in anti-phase, radio frequency signals transmitted by the transmitter circuit with radio frequency signals received by the receiver circuit, and wherein the cancellation circuit is configured to maintain a performance gradient through at least one of (a) adjusting a phase shift configuration or (b) adjusting a gain shifting configuration, and responsive to at least one of an adjustment to the (a) phase shift configuration or (b) the gain shifting configuration, recursively check received signal quality about an optimal operating point.

10. The point-to-point radio system of claim 9, wherein the cancellation circuit comprises a variable gain stage and a variable phase shifter.

11. The point-to-point radio system of claim 10, wherein the variable gain stage and the variable phase shifter operate in response to control signals to cancel transmitted radio frequency signals with received radio frequency signals to maintain electrical isolation between the transmit circuit and the receive circuit greater than a predetermined threshold.

12. The point-to-point radio system of claim 11, wherein the predetermined threshold is 20 dB.

13. The point-to-point radio system of claim 9, wherein the phased array antenna system comprises:
a first plurality of phase and gain shifters configured to receive a transmit signal from the transmit circuit and to provide to the transmit antenna elements a plurality of transmit signals to drive the transmit antenna elements; and
a second plurality of phase and gain shifters configured to receive a plurality of received signals from the receive antenna elements and provide to the receive circuit a single received signal, substantially suppressing unwanted interference from nearby interferers by steering one or more nulls of a receive antenna pattern.

14. The point-to-point radio system of claim 13, wherein the modem comprises beamforming logic coupled to the first plurality of phase and gain shifters and the second plurality of phase and gain shifters and configured to generate control signals to steer the one or more nulls of the receive antenna pattern.

15. The point-to-point radio system of claim 14, wherein the point-to-point radio system comprises a received signal quality circuit coupled to the beamforming logic and configured to provide to the beamforming logic a received signal quality output signal indicative of the signal quality of the received signal.

16. The point-to-point radio system of claim 15, wherein the beamforming logic is response to the received signal quality output signal to implement an adaptive algorithm to adjust the control signals to adaptively steer the one or more nulls of the receive antenna pattern in response to variations in the signal quality of the received signal.

17. The point-to-point radio system of claim 15, wherein the received signal quality output signal is indicative of one or more of received signal strength, signal-to-noise ratio and error vector magnitude of the received signal.

\* \* \* \* \*